United States Patent [19]
Bowman et al.

[11] Patent Number: 5,308,610
[45] Date of Patent: May 3, 1994

[54] ODOR CONTROL COMPOSITION AND METHOD OF USING SAME

[76] Inventors: Ronald W. Bowman; Robert R. Caycraft; L. C. Gramms; E. P. Caballero, all of 5574-B Everglades St., Ventura, Calif. 93003

[21] Appl. No.: 14,869

[22] Filed: Feb. 8, 1993

[51] Int. Cl.$^5$ ............................................. C02F 11/00
[52] U.S. Cl. ................................................... 424/76.5
[58] Field of Search ........................................ 424/76.5

[56] References Cited

U.S. PATENT DOCUMENTS

| | | | |
|---|---|---|---|
| 4,202,882 | 5/1980 | Schwartz | 424/76.5 |
| 4,396,522 | 8/1983 | Callicott et al. | 252/106 |

Primary Examiner—Glennon H. Hollrah
Assistant Examiner—S. Mark Clardy
Attorney, Agent, or Firm—Harrison & Egbert

[57] ABSTRACT

A method of controlling odors from a hydrocarbon-containing sludge including the steps of mixing a quaternary ammonium compound with water, adding a surface-active agent to the mixture of the quaternary ammonium compound and water, and dispersing the mixture into the hydrocarbon-containing sludge. A masking agent may be introduced to the mixture of the water, the quaternary ammonium compound, and the surface-active agent. A pH control agent is added to this mixture, along with a quantity of a polyglycol ether. The quaternary ammonium compound is benzalkonium chloride. The surface-active agent is butyl cellosolve. The masking agent is limonene. The step of dispersing the mixture includes spraying the mixture onto the hydrocarbon-containing sludge.

15 Claims, No Drawings

ODOR CONTROL COMPOSITION AND METHOD OF USING SAME

TECHNICAL FIELD

The present invention relates to methods and compositions for the control of odors from wastes. More particularly, the present invention relates to methods and compositions that can be used for the treatment of hydrocarbon-containing wastes.

BACKGROUND ART

A variety of compounds are presently used in various industries to treat malodorous materials, wastes, and fuels. The treatment chemicals are applied as odor-masking agents such as lemon or orange extracts, and biocides, such as aldehydes. Biocides work by killing the bacteria which produce malodorous materials such as organosulfur compounds and hydrogen sulfide. In some instances, both masking agents and biocides are simultaneously applied.

Although these materials are effective in many industries, their success in the oil industries (where oil biodegradation is performed) has been lacking. The major reason for lack of success in the oil industry is attributed to the strength of the waste and the low penetration of treatment chemicals on the sludge. The low penetration of treatment chemicals results in an increase in the strength of the treatment required. The masking agents, when used in high concentrations, result in a strong nauseating citrus smell. Biocides, to be effective in oily sludges, must be applied in high concentrations. These high concentrations kill not only the undesired anaerobic bacteria, but also the beneficial bacteria. The loss of the beneficial bacteria is extremely detrimental to the biodegradation of the oil and subsequently is not a desired treatment method.

In hydrocarbon-containing waste, the sludges can contain mercaptans, hydrogen sulfide, thios and other odorous compounds. The selective removal of the hydrogen sulfide, the mercaptans, the thios, and the other volatile odor-producing agents is extremely expensive by most commercially available odor-masking agents. In addition, most commercially available odor-masking agents only mask the odor and do not actually destroy the volatile odorous compounds. It is desirable to mask, as well as destroy, some of the odor-producing compounds.

In use, it is often very difficult to be able to intimately and integrally mix the treatment compound with the hydrocarbon-containing sludge or fuel. If it is necessary to carry out an intimate mixture of the items, then the cost of mixing may be excessive. Additionally, it may be necessary to actually load the sludge into a mixing apparatus so as to allow the chemical composition to effectively interact with the components of the sludge. As such, it is extremely desirable to create a chemical composition which can be simply sprayed onto the sludge.

It has been difficult to spray prior treatment compositions since such treatment compositions would not effectively penetrate the surface of the sludges. It is important to interact the treatment composition thoroughly throughout the sludge so as to effectively reduce odors. Surface treatment is one solution. However, over time, such surface treatment is very temporal in nature. Ultimately, the composition which is used to treat the sludge or fuel should be of a quality that effectively penetrates the surface.

It is an object of the present invention to provide a method and composition for the control of odors which effectively controls undesired bacteria as well as sequesters malodorous compounds.

It is another object of the present invention to provide an odor control composition that allows the chemical to interact with the sludge or fuel.

It is a further object of the present invention to provide an odor control composition which is relatively easy to manufacture, easy to use, and relatively inexpensive.

These and other objects and advantages of the present invention will become apparent from a reading of the attached specification and appended claims.

SUMMARY OF THE INVENTION

The present invention is a method of controlling odor from a hydrocarbon-containing sludge which comprises the steps of: (1) mixing a quaternary ammonium compound with water; (2) adding a surface-active agent with the mixture of the quaternary ammonium compound and water; and (3) dispersing the mixture onto the hydrocarbon-containing sludge. As used herein, the term "hydrocarbon-containing sludge" refers to both sludges and organic products, such as fuels. This method can further include the step of introducing a masking agent to the mixture of the water, the quaternary ammonium compound, and the surface-active agent. Sodium hydroxide is added to the mix so as to control the pH of the mixture.

Specifically, the quaternary ammonium compound is benzalkonium chloride in an amount of between 0.01 and 40% by volume of the water. The surface-active agent is BUTYL CELLUSOLVE (TM), generically ethylene glycol monobutyl ether in an amount of between 0.1 and 30% by volume of the mixture of water and the quaternary ammonium compound. The masking agent can be limonene in an amount of between 0.1 and 10% by volume of the mixture. Additionally, the surface-active agent can also be a polyglycol ether in an amount of between 0.01 and 5% by volume of the mixture. The sodium hydroxide is added to the mixture at an amount of between 0.001 and 0.1% of the volume of the mixture.

In order to control odors, the mixture is of a suitable form for spraying onto the sludge. In particular, the mixture may be sprayed directly to the surface of the sludge. The dispersants and demulsifiers of the mixture allow the mixture, when sprayed, to penetrate the surface of the sludge so as to control and interact with the odor-causing agents within the sludge. Alternatively, the mixture of the present invention can be integrally mixed with the sludges so that the composition of the present invention can interact directly throughout the volume of the sludge.

The present invention is also the odor control composition which includes each of the above-identified elements in a sprayable mixture.

DETAILED DESCRIPTION OF THE INVENTION

The present invention is an innovative compound which serves to mask and control the odors of sludges containing mercaptans, hydrogen sulfide, thios, and other odorous compounds. The present invention has been developed so as to have the ability to be sprayed on the sludge, mixed with the sludge, or sprayed into the air so as to mask the odor of the sludge. Certain components of the present composition react with hydrogen sulfide and mercaptans to essentially kill, as well as mask, the volatile odor-producing agents. The composition of the present invention has been formulated so as to significantly reduce the surface tension of oily wastes. This allows the composition of the present invention to have access to mild concentrations of bacteriostatic chemicals and chemicals reactive with organosulfur compounds. The composition of the present invention contains cationic detergents which are also bacteriostatic in nature, nonionic surfactants with bacteriostatic characteristics, low levels of masking agents, solvents, and pH control elements so as to improve the activity of the chemicals in the formulation and to provide suitable pH control.

Fundamentally, the present invention employs a quaternary ammonium compound for the neutralization of the odor-causing chemicals. This quaternary ammonium compound also serves as a bacteriostatic agent. The quaternary ammonium compound is a derivative of ammonium hydroxide or its salts. In this derivative, all four replacable hydrogen atoms of the $NH_4$ group have been replaced by organic radicals. For example, tetramethyl ammonium chloride is a suitable quaternary ammonium compound. Alternatively, benzalkonium chloride can also serve as the quaternary ammonium compound for the present invention. Although quaternary ammonium compounds have been used as biocides in other industries, the successful application to petroleum-based materials has not been achieved. In certain concentrations, these quaternary ammonium compounds act as a biocide for anaerobic bacteria, but do not attack the aerobic bacteria as effectively. The quaternary ammonium compounds also serve as a sequestering agent on sulphur and organosulfur-based compounds.

In the simplest embodiment of the present invention, water can be mixed with 0.01% to 30% ADOGEN (TM), generically benzalkonium chloride, by volume, so as to create the odor control composition of the present invention. Benzalkonium chloride is a quaternary ammonium compound. In the mixture of the simplest embodiment of the present invention, the combination of the quaternary ammonium compound and water, serves roughly the purposes of acting as an odor control composition. However, the ability to properly penetrate the hydrocarbon-containing sludge, to effectively interact with the odor-producing agents within the sludge, and to effectively control odors, is extremely limited. This simple composition only serves to demonstrate the efficacy of the use of benzalkonium chloride and water for the purposes of an odor control agent.

In the preferred embodiment of the present invention, the composition of the present invention will employ a cationic detergent (such as benzalkonium chloride), a nonionic surfactant (such as tergitol), a dispersant and/or masking agent (limonene), and a solvent (BUTYL CELLOSOLVE (TM)). A pH control agent, such as sodium hydroxide, can also be employed for the purposes of controlling the pH of the composition and for facilitating the interaction of the composition with the odor-producing agents.

Benzalkonium chloride is a mixture of alkyldimethylbenzylammonium chlorides of the general formula in which represents a mixture of the alkyls from $C_8H_{17}$ to $C_{18}H_{37}$. Benzalkonium chloride is a white or yellowish white amorphous powder or gelatinous pieces. It is very soluble in water, alcohol, and acetone. It is slightly soluble in benzene. Benzalkonium chloride is incompatible with anionic detergents, such as soap, and with nitrates. A white precipitate is formed in a 1:3000 aqueous solution of benzalkonium chloride when nitrates are present in concentrations greater than the equivalent of 0.5% ammonium nitrate. In general, benzalkonium chloride is useful as a cationic surface-active agent and as a germicide.

The BUTYL CELLOSOLVE (TM) is an ethylene glycol monobutyl ether. It is otherwise known as 2-Butoxyethanol. It is prepared from butyl alcohol and ethylene carbonate or 2-chloroethanol. It can also be prepared from ethylene glycol and butyl bromide. BUTYL CELLOSOLVE (TM) serves as a solvent for nitrocellulose, resins, grease, oil, and albumin.

The limonene acts as a dispersant in the composition of the present invention. Limonene is specifically identified as 1-Methyl-4-(1-methylethenyl) cyclohexene. Limonene occurs in various ethereal oils, and, in particular, in oils with lemon, orange, caraway, dill, and bergamot. It is practically insoluble in water and is miscible with alcohol. In use, it serves as a solvent for the manufacture of resins and also serves as a wetting and dispersing agent.

In the present invention, sodium hydroxide is used for the purpose of controlling the pH of the composition. It also serves to improve the activity of the other chemicals within the formulation. Sodium hydroxide is otherwise known as caustic soda or as sodium hydrate. It is formed by reacting calcium hydroxide with sodium carbonate. Sodium hydroxide rapidly absorbs carbon dioxide and water from the air. Sodium hydroxide is used to neutralize acids and to make sodium salts. In petroleum refining, it is used to remove sulfuric and organic acids. They also serve to precipitate alkaloids and most metals from water solutions of their salts.

The tergitol is a polyglycol ether surfactant. In the present invention, the tergitol acts as a demulsifier.

The components of the composition of the present invention can be combined in various proportions and concentrations so as to produce an effective odor control composition. The preferred composition of the present invention is illustrated by the composition of the following table:

TABLE I

|  | % by Volume |
| --- | --- |
| Inj. Soft $H_2O$ | 88.74 |
| Benzalkonium Chloride | 7.88 |
| Ethylene Glycol Monobutyl Ether | 1.13 |
| Limonene | 1.27 |
| 6N NaOH | 0.0048 |
| Tergitol | 0.98 |

This composition has been found to be most effective in the controlling and masking of odors from hydrocarbon-containing sludges. The proportions have proven to be effective in reducing odor emissions significantly. This composition is also effective as a spray for the surface of the sludge or for the air surrounding the sludge.

A composition of the present invention which has also been found to be effective in the treatment of hydrocarbon-containing sludges is represented by the composition of Table II as follows:

TABLE II

| | % by Volume |
|---|---|
| H₂O | 85 |
| 50% Benzalkonium Chloride | 12 |
| Ethylene Glycol Monobutyl Ether | 1 |
| Limonene | 1 |
| Tergitol | 1 |

This composition has been found to be effective for the controlling of odors and is in a suitable form for being sprayed onto the area requiring odor control. It can also be mixed with the slurry or solution requiring odor control. Additionally, this composition can be sprayed into the air in the vicinity of the material requiring odor control. The odor control and reducing agents should be mixed with the water carrier in a sequential order for the most effective solution.

The composition indicated in Table II effectively controls and masks odors while reducing costs up to a factor of twenty times less than other commercially available odor-masking agents. This solution has been found to be effective for the reduction, as well as masking, of odor-producing compounds. Since the solution is water-soluble, it can be mixed with most odor-producing water-based materials. Additionally, this solution can also be sprayed onto the sludge or other areas of odor-producing agents.

Table III shows the composition of the present invention in which the components are shown as used in their maximum amounts. The composition of Table III is as follows:

TABLE III

| | % by Volume |
|---|---|
| H₂O | 14.9 |
| Benzalkonium Chloride | 40 |
| Ethylene Glycol Monobutyl Ether | 30 |
| Limonene | 10 |
| 6N NaOH | 0.1 |
| Tergitol | 5 |

Although the composition illustrated in Table III can be effective in the treating of odors, the large concentration of each of the components will cause the cost of the composition of Table III to be higher than optimal. Because of the high concentrations of each of the components, there is the potential for additional reactivity with the odor-producing sludge. However, the composition proportions, indicated by Table III can, in certain circumstances, be considered effective in the controlling of odors.

Table IV illustrates the proportions of the composition of the present invention in which the components are as minimal as necessary. Table IV is as follows:

TABLE IV

| | % by Volume |
|---|---|
| H₂O | 99.8 |
| Benzalkonium Chloride | 0.01 |
| Ethylene Glycol Monobutyl Ether | 0.1 |
| Limonene | 0.1 |
| 6N NaOH | 0.001 |
| Tergitol | 0.01 |

Since the components of this composition are very small in quantity, the composition of Table IV is extremely inexpensive. However, because of the small proportions, the composition may be less than effective on most odor-producing sludges. The composition of Table IV will have minimal reactivity with the odor-producing chemicals. However, the composition of Table IV may be suitable in certain extreme situations. As such, the composition of Table IV should be considered within the scope of the present invention.

In general, the benzalkonium chloride should comprise between 0.01 and 40% by volume of the total composition of the odor controller of the present invention. In general, the ethyleneglycol monobutyl ether should comprise between 0.1 and 30% by volume of the total composition. The limonene should comprise between 0.1 and 10% by volume of the composition of the present invention. The sodium hydroxide is used in very small percentages, between 0.001 and 0.1% by volume of the total composition. Finally, the polyethylene glycol (i.e., tergitol) should be used in an amount between 0.01 and 5% of the volume of the mixture.

In the method of the present invention, the benzalkonium chloride is initially mixed with water. After this mixture has been completed, then the ethylene glycol monobutyl ether is mixed with the combination of benzalkonium chloride and water. Limonene is then added to this mixture of ethylene glycol monobutyl ether, benzalkonium chloride, and water. Finally, the tergitol is added to the above-stated mixture. The sequential mixing of these components is the most effective method for the production of the composition of the present invention.

As used herein, the benazlkonium chloride acts as a biocide for the anaerobic bacteria, but does not attack the aerobic material as effectively. Additionally, the benzalkonium chloride acts as a sequestering agent on sluphur and organosulfur-based compounds. The combined chemicals, as recited hereinabove, provide a synergistic effect both on the control of undesired bacteria as well as the sequestering of malodorous compounds. This allows the application of the benazlkonium chloride to land farming operations with no significant detrimental effect on the biodegradation of hydrocarbons. In the past, the application of quaternary ammonium compounds was not very effective because the concentration required to eliminate odor was too high to allow the needed bacterial population to survive. This higher concentration of quaternary ammonium compound was needed because the sludge was not effectively wetted due to the high concentration of hydrocarbons. The wettability problem was overcome by the inclusion of surface-active agents into the formulation. All of the compounds used in the formulation have distinct and unique wetting and bacteriostatic capabilities. These characteristics allow for the most effective penetration of the sequestering and bacteriostatic agents. This also allows them to perform their neutralizing activity in a most effective fashion.

The deodorizer of the present invention can be used in sludges and in organic products, such as fuels. When used in a hydrocarbon media, the components of the deodorizer can be dissolved in a highly aromatic solvent and introduced at levels from 10 ppm to several thousand ppm.

The components of the formulations can be substituted or added as demands require. For example, if chelating agents are required, then edetic acid (EDTA) can be included in the formulation. As another example, if adherence to a substrate is required, then an amphoteric surfactant, such as dihydroxyethyl tallow glycinate, may be added to the formulation. The pH of the formulation can be accomplished with either ammonium hydroxide or organo amine compounds. High molecular alcohols may also be added or substituted.

The foregoing disclosure and description of the invention is illustrative and explanatory thereof. Various changes in the method and composition of the present invention can be made within the scope of the appended claims without departing from the true spirit of the invention. The present invention should only be limited by the following claims and their legal equivalents.

I claim:

1. A method of controlling odors from a hydrocarbon-containing sludge comprising the steps of:
    mixing a benzalkonium chloride with water in an amount between 0.01 and 40% by volume of the water;
    adding ethylene glycol monobutyl ether to the mixture of the benzalkonium chloride and water in an amount between 0.01 and 30% by volume of the mixture;
    mixing a pH control agent to the mixture of benzalkonium chloride and water and ethylene glycol monobutyl ether, said pH control agent selected from the group consisting of: sodium hydroxide, ammonium hydroxide, and organo amine compounds; and
    dispersing the mixture having the benzalkonium chloride and ethylene glycol monobutyl ether and pH control agent into the hydrocarbon-containing sludge.

2. The method of claim 1, further comprising the step of:
    introducing limonene to the mixture of the water and the benzalkonium chloride and the ethylene glycol monobutyl ether and the pH control agent.

3. The method of claim 1, said benzalkonium chloride being 50% benzalkonium chloride in an amount of 12% by volume of the water.

4. The method of claim 2, said limonene being in an amount of between 0.1 and 10% by volume of the mixture.

5. The method of claim 1, said pH control agent added to the mixture in an amount of between 0.001 and 0.1% of the volume of the mixture.

6. The method of claim 1, said step of dispersing comprising:
    spraying the mixture onto the sludge.

7. The method of claim 1, said step of dispersing comprising:
    mixing the mixture with the sludge.

8. An odor control composition comprising:
    water in an amount of between 60 and 99.8% of the total volume of the composition;
    benzalkonium chloride in an amount of between 0.01 and 40% by volume of the total composition;
    ethylene glycol monobutyl ether in an amount of between 0.1 and 30% by volume of the total composition; and
    a pH control agent in an amount of between 0.01 and 0.1% by volume of the total composition.

9. The composition of claim 8, said benzalkonium chloride being 50% benzalkonium chloride.

10. The composition of claim 8, further comprising:
    a limonene in an amount of between 0.1 and 10% by volume of the total composition.

11. The composition of claim 10, further comprising:
    polyglycol ether in an amount of between 0.01 and 5% by volume of the total composition.

12. The composition of claim 8, said pH control agent being sodium hydroxide.

13. An odor control composition comprising:
    50% benzalkonium chloride in an amount of between 0.01 and 40% by volume of the total composition;
    ethylene glycol monobutyl ether in an amount of between 0.1 and 30% by volume of the total composition;
    limonene in an amount of between 0.1 and 10% by volume of the total composition;
    a pH control agent in an amount of between 0.001 and 0.1 by volume of the total composition, said pH control agent being a chemical selected from the group consisting of: sodium hydroxide, ammonium hydroxide, and organo amine compounds; and
    polyglycol ether in an amount of between 0.01 and 5% by volume of the total composition, said butyl cellosolve, said limonene, said sodium hydroxide, and said polyglycol ether mixed with water, said water comprising the balance of the total composition.

14. The composition of claim 13, said composition consisting essentially of:
    said benzalkonium chloride in an amount of 8% by volume, said ethylene glycol monobutyl ether in an amount of 1% by volume, said limonene in an amount of 1% by volume, said pH control agent being sodium hydroxide in an amount of 0.005% by volume, and said polyglycol ether in an amount of 1% by volume.

15. The composition of claim 14, said water being approximately 89% by volume of the total composition.

* * * * *